US005375512A

United States Patent [19]

Ertmer

[11] Patent Number: 5,375,512

[45] Date of Patent: Dec. 27, 1994

[54] APPARATUS TO SUPPORT A FRUIT OR VEGETABLE ON A SPHERICAL SURFACE AND TO SLICE IT WITH A SINGLE STROKE

[76] Inventor: Lyle E. Ertmer, P.O. Box 169, 201 Garfield, Hanover, Ill. 61041

[21] Appl. No.: 251,043

[22] Filed: May 31, 1994

[51] Int. Cl.[5] ............ A47J 17/00

[52] U.S. Cl. ............ 99/538; 83/407; 83/425.3; 83/437; 83/451; 99/537

[58] Field of Search ............ 99/537, 538, 509, 543, 99/544, 643, 588; 83/437, 451, 570, 594, 595, 431, 404.3, 407, 857, 425.3; 30/113.1, 114, 303–305

[56] References Cited

U.S. PATENT DOCUMENTS

| | | | |
|---|---|---|---|
| 507,383 | 10/1893 | O'Connell | 83/437 |
| 1,947,153 | 2/1934 | Dellinger | 83/437 |
| 3,924,501 | 12/1975 | Cohen et al. | 83/404.3 |
| 4,059,037 | 11/1977 | Gerson et al. | 83/407 |
| 4,062,260 | 12/1977 | Steinogl | 83/437 |
| 4,095,518 | 6/1978 | Jones | 99/538 |
| 4,346,634 | 8/1982 | Jones | 83/404.3 |
| 4,436,025 | 3/1984 | Jones | 99/538 |
| 4,569,280 | 2/1986 | D'Ambro et al. | 99/538 |
| 5,142,973 | 9/1992 | Tur et al. | 99/538 |
| 5,271,317 | 12/1993 | Aguerrevere et al. | 99/538 |

*Primary Examiner*—Timothy F. Simone

[57] ABSTRACT

An apparatus to support a fruit or vegetable on a spherical surface and to slice it with a single stroke comprising; a frame constructed of two vertically disposed members in an A-shape configuration with parallel lower edges and a centrally disposed upper edge, and with lateral support beams extending horizontally and coupling the lower edges of the two A-shape frames and the upper edge of the two A-shape frames, the A-shape frames each having a vertically disposed central member with a vertical slot therein to define a path of travel between the two parallel slots; a support with an upper surface fixedly retained within the frame between the A-frame members configured in the general form of a partial sphere, the support having a plurality of parallel openings.

3 Claims, 3 Drawing Sheets

FIG. 1
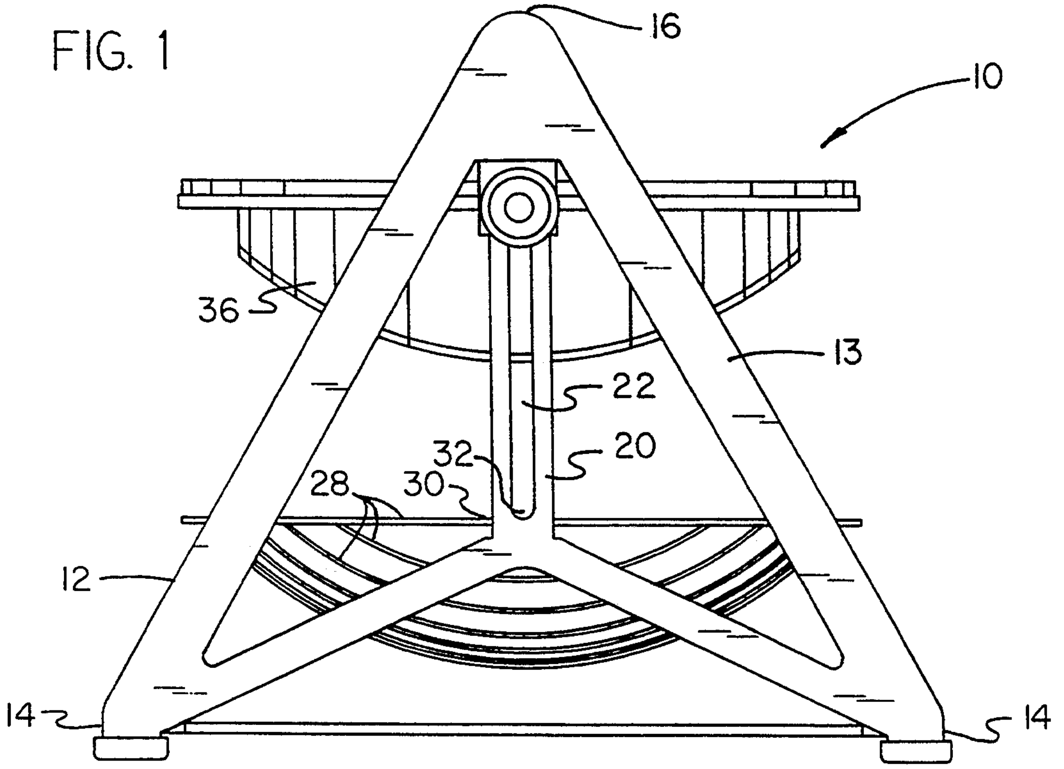
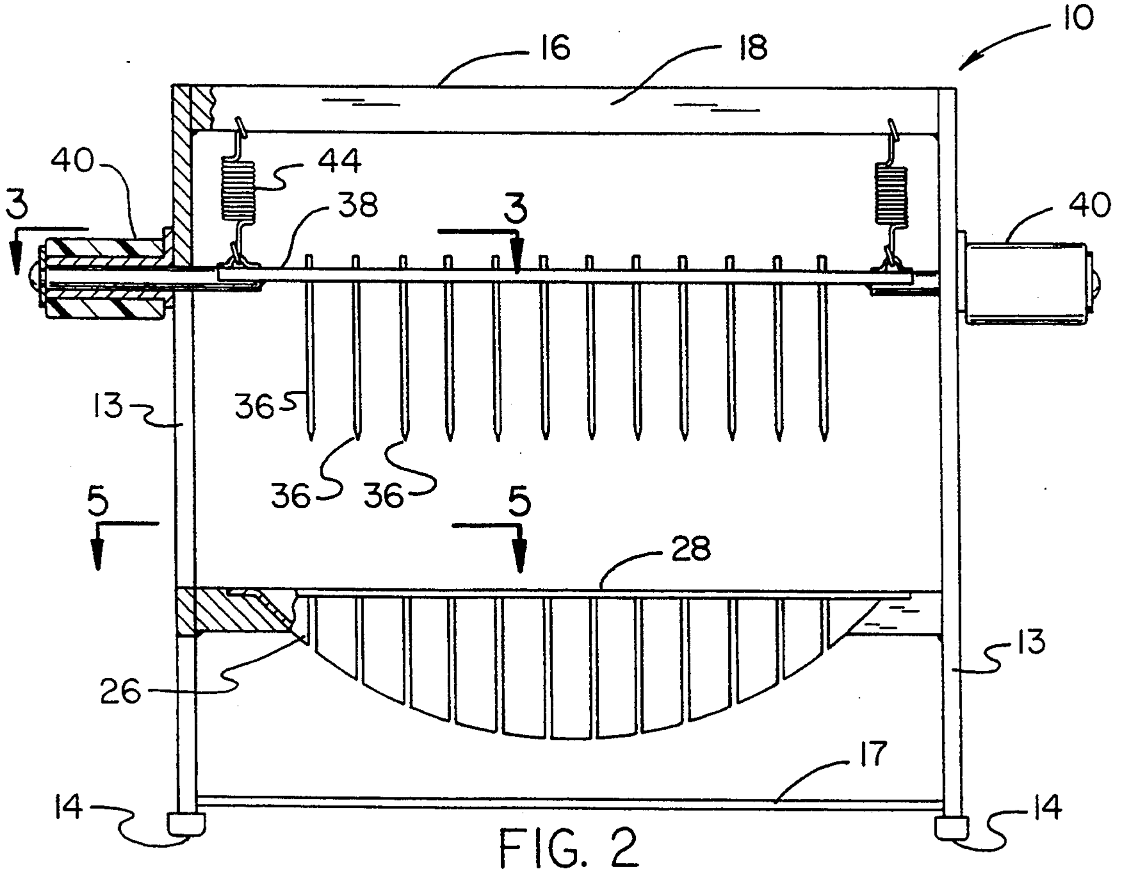
FIG. 2

FIG. 5
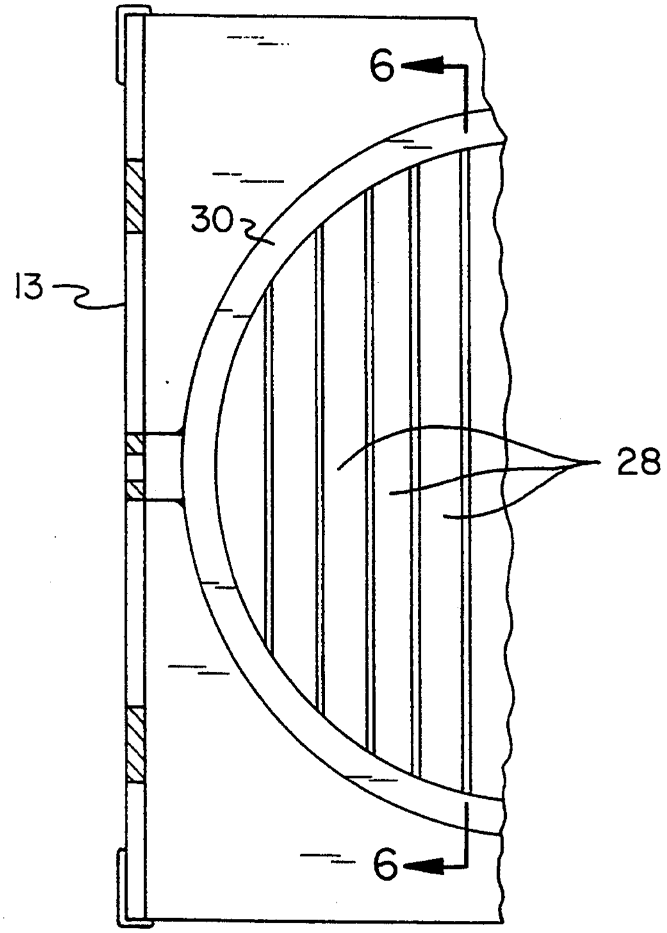
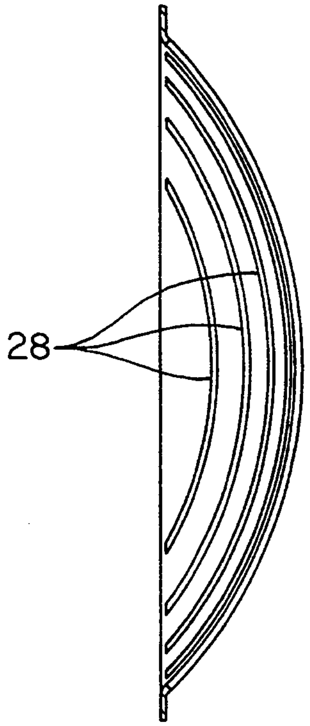
FIG. 6

APPARATUS TO SUPPORT A FRUIT OR VEGETABLE ON A SPHERICAL SURFACE AND TO SLICE IT WITH A SINGLE STROKE

BACKGROUND OF THE INVENTION

1. Field of the Invention

The present invention relates to apparatus to support a fruit or vegetable on a spherical surface and to slice it with a single stroke and more particularly pertains to slicing a piece of fruit or vegetable supported on a spherical surface through a single stroke of parallel oriented blades.

2. Description of the Prior Art

The use of slicing devices of various constructions for fruits and vegetables is known in the prior art. More specifically, slicing devices of various constructions for fruits and vegetables heretofore devised and utilized for the purpose of cutting and slicing a piece of fruit or vegetable with devices of a wide variety of constructions are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 3,830,152 to Reed discloses an onion topper and slicer.

U.S. Pat. No. 3,949,637 to Funke and nee Honsel discloses an onion slicer.

U.S. Pat. No. 5,063,674 to Rowell discloses a vegetable slicer.

U.S. Pat. No. 4,302,997 to Jones et al. discloses a guarded tomato slicer.

U.S. Pat. No. 4,310,971 to Rowell discloses a vegetable slicer.

In this respect, the apparatus to support a fruit or vegetable on a spherical surface and to slice it with a single stroke according to the present invention substantially departs from the conventional concepts and designs of the prior art, and in so doing provides an apparatus primarily developed for the purpose of slicing a piece of fruit or vegetable supported on a spherical surface through a single stroke of parallel oriented blades.

Therefore, it can be appreciated that there exists a continuing need for new and improved apparatus to support a fruit or vegetable on a spherical surface and to slice it with a single stroke which can be used for slicing a piece of fruit or vegetable supported on a spherical surface through a single stroke of parallel oriented blades. In this regard, the present invention substantially fulfills this need.

SUMMARY OF THE INVENTION

In view of the foregoing disadvantages inherent in the known types of slicing devices of various constructions for fruits and vegetables now present in the prior art, the present invention provides an improved apparatus to support a fruit or vegetable on a spherical surface and to slice it with a single stroke. As such, the general purpose of the present invention, which will be described subsequently in greater detail, is to provide a new and improved apparatus to support a fruit or vegetable on a spherical surface and to slice it with a single stroke apparatus and method which has all the advantages of the prior art and none of the disadvantages.

To attain this, the present invention essentially comprises a new and improved apparatus to support a fruit or vegetable on a spherical surface and to slice it with a single stroke comprising, in combination: a frame constructed of two vertically disposed members in an A-shape configuration with parallel lower edges and a centrally disposed upper edge, and with lateral support beams extending horizontally and coupling the lower edges of the two A-shape frames and the upper edge of the two A-shape frames, the A-shape frames each having a vertically disposed central member with a vertical slot therein to define a path of travel between the two parallel slots; a support with an upper surface fixedly retained within the frame between the A-frame members configured in the general form of a partial sphere, the upper edge being located at an elevation essentially equal to the lower edge of the slots, the support having a plurality of parallel recesses over the majority of its length parallel with the a-frame supports; a plurality of blades equal in number and location to the recesses in the support member with a retention plate secured to the blades adjacent to the upper end thereof, the support plate including handles on the opposite ends thereof on the exterior sides of the A-frames and a pair of springs with each spring coupling the lower edge of the upper lateral support beam with the upper edge of the support plate whereby downward movement of the blades as effective through downward movement of the handles to move the retention plate along the length of the slot will move the blades into contact with an object on the surface of the support to be sliced with the blades continuing their motion downwardly through the recesses, the tips of the blades being in lateral alignment whereby the cutting will be made from the central extent of the blades first contacting the object with subsequential contact effecting the cutting of the exterior regions thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus to support a fruit or vegetable on a spherical surface and to slice it with a single stroke which has all the advantages of the prior art slicing devices of various constructions for fruits and vegetables and none of the disadvantages.

It is another object of the present invention to provide a new and improved apparatus to support a fruit or vegetable on a spherical surface and to slice it with a single stroke which may be easily and efficiently manufactured and marketed.

It is a further object of the present invention to provide a new and improved apparatus to support a fruit or vegetable on a spherical surface and to slice it with a single stroke which is of a durable and reliable construction.

An even further object of the present invention is to provide a new and improved apparatus to support a fruit or vegetable on a spherical surface and to slice it with a single stroke which is susceptible of a low cost of manufacture with regard to both materials and labor, and which accordingly is then susceptible of low prices of sale to the consuming public, thereby making such slicing devices of various constructions for fruits and vegetables economically available to the buying public.

Still yet another object of the present invention is to provide a new and improved apparatus to support a fruit or vegetable on a spherical surface and to slice it with a single stroke which provides in the apparatuses and methods of the prior art some of the advantages thereof, while simultaneously overcoming some of the disadvantages normally associated therewith.

Still another object of the present invention is to slice a piece of fruit or vegetable supported on a spherical surface through a single stroke of parallel oriented blades.

Lastly, it is an object of the present invention to provide a new and improved An apparatus to support a fruit or vegetable on a spherical surface and to slice it with a single stroke comprising; a frame constructed of two vertically disposed members in an A-shape configuration with parallel lower edges and a centrally disposed upper edge, and with lateral support beams extending horizontally and coupling the lower edges of the two A-shape frames and the upper edge of the two A-shape frames, the A-shape frames each having a vertically disposed central member with a vertical slot therein to define a path of travel between the two parallel slots; a support with an upper surface fixedly retained within the frame between the A-frame members configured in the general form of a partial sphere, the support having a plurality of parallel openings. In claims 2 and 3 recesses become openings over the majority of its length parallel with the a-frame supports; a plurality of blades equal in number and location to the recesses in the support member with a retention plate secured to the blades adjacent to the upper end thereof, the support plate including handles on the opposite ends thereof on the exterior sides of the A-frames.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the new and improved apparatus to support a fruit or vegetable on a spherical surface and to slice it with a single stroke constructed in accordance with the principles of the present invention.

FIG. 2 is a front elevational view partly in section of the device illustrated in FIG. 1.

FIG. 5 is a cross-sectional view taken along line 5—5 of FIG. 2. FIG. 6 is a cross-sectional view taken along line 6—6 of FIG. 5.

DESCRIPTION OF THE PREFERRED EMBODIMENT

Figure 3:
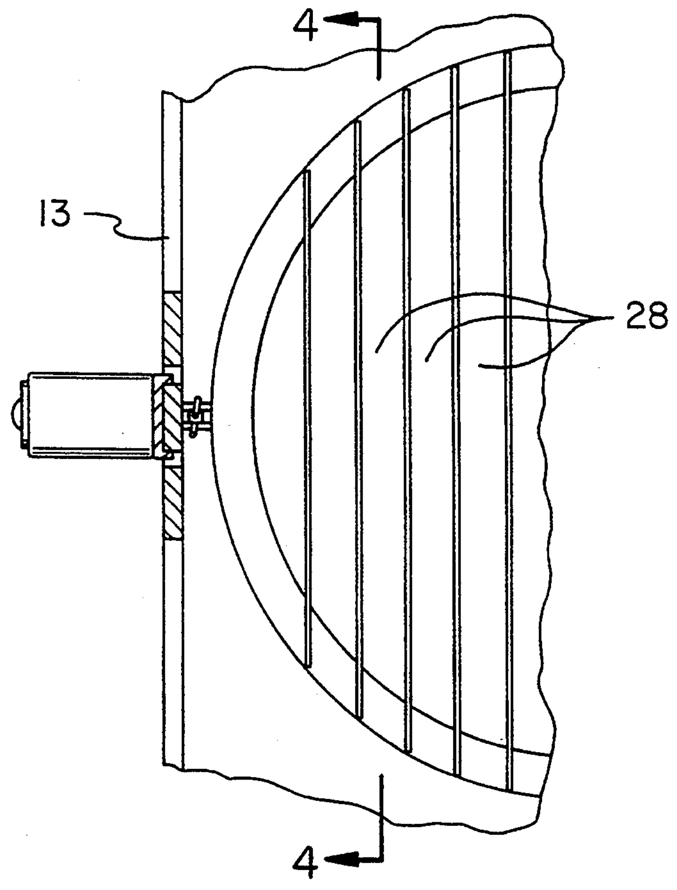
FIG. 3 is an enlarged top plan view of one end of the device taken along line 3—3 of FIG. 2.
Figure 4:
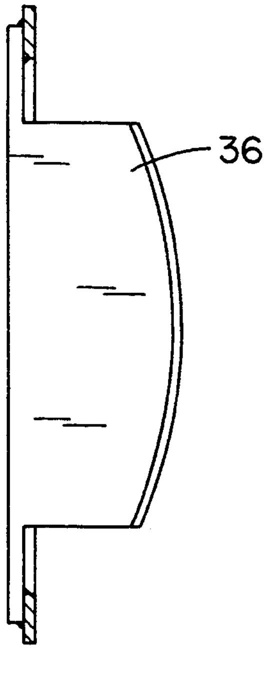
FIG. 4 is a cross-sectional view taken along line 4—4 of FIG. 3.

With reference now to the drawings, and in particular to FIG. 1 thereof, a new and improved apparatus to support a fruit or vegetable on a spherical surface and to slice it with a single stroke embodying the principles and concepts of the present invention and generally designated by the reference numeral 10 will be described.

The present invention, the new and improved apparatus to support a fruit or vegetable on a spherical surface and to slice it with a single stroke, is a system 10 comprised of a plurality of components. In its broadest context, such components include a frame, a support, and a plurality of blades. Such components are individually configured and correlated with respect to each other so as to attain the desired objective.

Specifically, the system 10 of the present invention has at its center, a frame 12. The frame is constructed of two vertically disposed members in A-shaped configuration. Such parallel lower edges 14 and a centrally disposed upper edge 16. Coupling between the A-frames is effected through a plurality of support beams. The support beams include two laterally disposed support beams extending horizontally and coupling the lower edges of the two A-frames. Also included is an upper horizontal support beam 18. Such upper beam couples the upper edge of the two A-frames. The A-frames each have a vertically disposed central member 20 with a vertical slot 22 therein. The slot defines a path of travel between the two slots.

Next provided as part of the system 10 is a support 26. The support has an upper surface 28 and is fixedly retained within the frame between the A-frame members. Support as its upper surface configured generally in the form or shape of a partial sphere. This is to correspond in configuration with a fruit or vegetable to be cut as it is placed upon the upper surface of the support. The upper edge 30 of the support is located at an elevational location essentially equal to the lower edge 32 of the slots. The support has a plurality of parallel recesses or narrow slit like opening over the majority of its length. Such recesses are parallel with a frame support.

Centrally interrelated between the frame and the support are a plurality of blades 36. The blades are equal in number and location to the recesses in the support member. In association with the blades is a retention plate 38. The retention plate is formed integrally with and secured to the blades. It is located adjacent to the upper ends of the blades. The support plate also includes handles 40 on the opposite ends of the retention plate on the exterior sides of the A-frame.

Operation of the system 10 and movement of the blades is facilitated through the use of springs 44. Each spring couples the lower end of the upper lateral support beam with the upper edge of the support plate. The springs are coil springs tending to raise the support plates and blades to an elevated location sufficient to allow the placement of the fruit or vegetable to be cut on the upper surface of the support. In this manner, downward movement of the blades is effected through the downward movement of the handles held by the operator. This moves the retention plate and handles downwardly along the length of the slots. This will move the blades into contact with the object on the upper surface of the support to be sliced. The blades continue through downward motion through the recesses. The tips of the blades are in lateral alignment whereby the cutting will be initially made from the central extents of the blades and the middle of the objects being cut wherein cutting contact is first made. ???? continues in a sequential manner effecting the next adjacent areas on opposite sides of the center line working outwardly to the exterior regions of the blades, recesses and object being cut.

The present invention offers a manually operated tool that slices whole vegetables and fruits with a single stroke. Without such a tool, each slicing cut must be made individually. A tomato, onion, or other vegetable requires several such cuts, so the task is time consuming and costly, especially if it is done in a commercial establishment. It is also almost impossible to make each cut so the pieces will be uniform in thickness. With a single downward push, this tool slices the entire vegetable into perfectly uniform pieces.

The present invention consists of a stationary set of cutting blades and a set of moveable blades. They are mounted on an A-frame type stand. The stationary blades are arranged in a hemispherical cup that supports the vegetable. Above the cup are the fixed blades, attached to a guillotine type slide. When the blade assembly is pushed down, the razor sharp edges on the fixed moveable blades slice through the item neatly and quickly. The work is done without manually holding the vegetables, so there is no danger to the user.

The present invention is made of stainless steel to resist stain and coercion, and to last indefinitely. It may be simply produced from readily available materials. Every kitchen and cook should have this invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus to support a fruit or vegetable on a spherical surface and to slice it with a single stroke comprising, in combination:

a frame constructed of two vertically disposed members in an A-shape configuration with parallel lower edges and a centrally disposed upper edge, and with lateral support beams extending horizontally and coupling the lower edges of the two A-shape frames and the upper edge of the two A-shape frames, the A-shape frames each having a vertically disposed central member with a vertical slot therein to define a path of travel between the two parallel slots;

a support with an upper surface fixedly retained within the frame between the A-frame members configured in the general form of a partial sphere, the upper edge being located at an elevation essentially equal to the lower edge of the slots, the support having a plurality of parallel recesses over the majority of its length parallel with the A-frame supports; and a plurality of blades equal in number and location to the recesses in the support member with a retention plate secured to the blades adjacent to the upper end thereof, the support plate including handles on the opposite ends thereof on the exterior sides of the A-frames and a pair of springs with each spring coupling the lower edge of the upper lateral support beam with the upper edge of the support plate whereby downward movement of the blades as effective through downward movement of the handles to move the retention plate along the length of the slot will move the blades into contact with an object on the surface of the support to be sliced with the blades continuing their motion downwardly through the recesses, the tips of the blades being in lateral alignment whereby the cutting will be made from the central extent of the blades first contacting the object with subsequential contact effecting the cutting of the exterior regions thereof.

2. An apparatus to support a fruit or vegetable on a spherical surface and to slice it with a single stroke comprising;

a frame constructed of two vertically disposed members in an A-shape configuration with parallel lower edges and a centrally disposed upper edge, and with lateral support beams extending horizontally and coupling the lower edges of the two A-shape frames and the upper edge of the two A-shape frames, the A-shape frames each having a vertically disposed central member with a vertical slot therein to define a path of travel between the two parallel slots;

a support with an upper surface fixedly retained within the frame between the A-frame members configured in the general form of a partial sphere, the support having a plurality of parallel recesses over the majority of its length parallel with the A-shaped frames; and a plurality of blades equal in number and location to the recesses in the support member with a retention plate secured to the blades adjacent to the upper end thereof, the support plate including handles on the opposite ends thereof on the exterior sides of the A-frames.

3. The apparatus as set forth in claim 2 and further including a pair of springs with each spring coupling the lower edge of the upper lateral support beam with the upper edge of the support plate whereby downward movement of the blades as effective through downward movement of the handles to move the retention plate along the length of the slot will move the blades into contact with an object on the surface of the support to be sliced with the blades continuing their motion downwardly through the recesses, the tips of the blades being in lateral alignment whereby the cutting will be made from the central extent of the blades first contacting the object with subsequential contact effecting the cutting of the exterior regions thereof.

* * * * *